United States Patent [19]
Seto et al.

[11] Patent Number: 5,991,873
[45] Date of Patent: Nov. 23, 1999

[54] MICROPROCESSOR FOR SIMULTANEOUSLY PROCESSING DATA CORRESPONDING TO A PLURALITY OF COMPUTER PROGRAMS

[75] Inventors: Koshi Seto, Yokohama; Yukimasa Uemura, Niigata, both of Japan

[73] Assignee: Kabushiki Kaisha Toshiba, Kawasaki, Japan

[21] Appl. No.: 08/337,196

[22] Filed: Nov. 7, 1994

Related U.S. Application Data

[63] Continuation of application No. 07/925,661, Aug. 7, 1992, abandoned.

[30] Foreign Application Priority Data

Aug. 9, 1991 [JP] Japan ..................................... 3-200517

[51] Int. Cl.⁶ ................................................ G06F 15/46
[52] U.S. Cl. .......................................... 712/245; 712/230
[58] Field of Search ................................... 395/378, 800, 395/650; 712/245, 43, 230; 709/107, 108

[56] References Cited

U.S. PATENT DOCUMENTS

| | | | |
|---|---|---|---|
| 3,573,852 | 4/1971 | Watson et al. ........................... | 395/650 |
| 3,875,564 | 4/1975 | Thuruoka et al. ....................... | 395/375 |
| 3,972,024 | 7/1976 | Schroeder et al. ...................... | 395/375 |
| 4,167,781 | 9/1979 | Beccia et al. ............................ | 395/375 |
| 4,344,129 | 8/1982 | Asada et al. ............................. | 395/375 |
| 4,502,790 | 3/1985 | Yokoyama .............................. | 367/200 |
| 4,517,637 | 5/1985 | Cassell ..................................... | 364/138 |
| 4,953,078 | 8/1990 | Petit ......................................... | 395/375 |
| 5,367,678 | 11/1994 | Lee et al. ................................ | 395/650 |

*Primary Examiner*—Larry D. Donaghue
*Attorney, Agent, or Firm*—Oblon, Spivak, McClelland, Maier & Neustadt, P.C.

[57] ABSTRACT

A microprocessor for processing data corresponding to a plurality of computer programs includes multiple program counters each specifying a program address of a computer program having data to be processed, a selector for sequentially selecting the program counters, the selector having multiple independent storage sections for storing a plurality of arbitrary selection order of the program counters, an arithmetic logic unit for processing data of the computer program corresponding to the program address stored in one of the program counters selected by the selector, and a device for transferring data between the program counters, the selector, and the arithmetic logic unit.

11 Claims, 3 Drawing Sheets

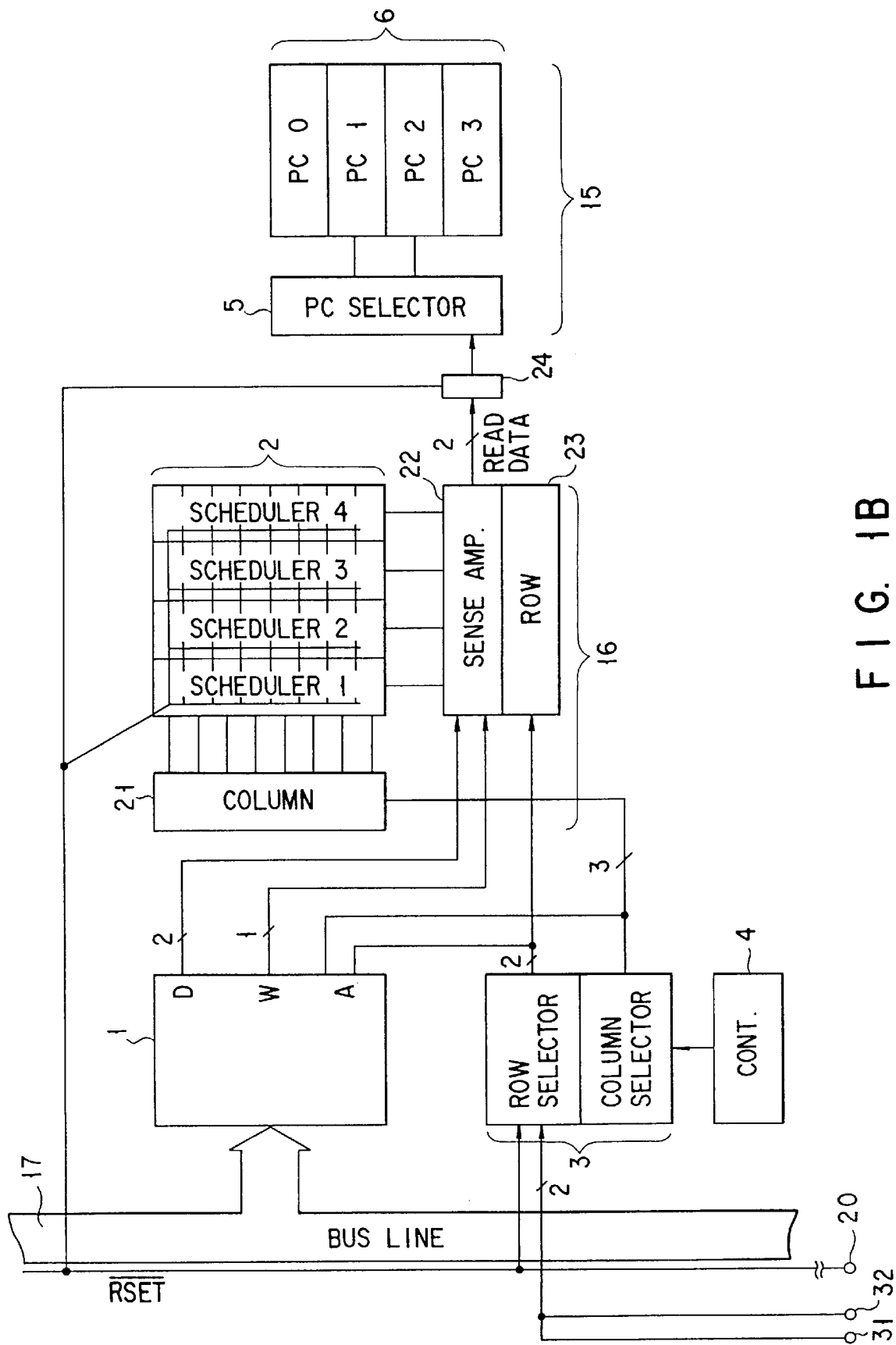
F I G. 1B

MICROPROCESSOR FOR SIMULTANEOUSLY PROCESSING DATA CORRESPONDING TO A PLURALITY OF COMPUTER PROGRAMS

This application is a Continuation of application Ser. No. 07/925,661, filed on Aug. 07, 1992, now abandoned.

BACKGROUND OF THE INVENTION

1. Field of the Invention

The present invention relates to a system of a microprocessor suitable for simultaneously executing a plurality of independent programs.

2. Description of the Related Art

As an operation system of the microprocessor suitable for simultaneously executing a plurality of independent programs, an interruption system, a time slice system, and a multiprocessor system have been conventionally used.

The interruption system can be explained as follows.

If a specific interruption signal is generated while a program of a computer is executed, the program that is being executed is suspended and the program is branched to another routine for processing the specific program in which the interruption is received. After the program is executed, the program is returned to the original routine, and the operation of the original program is started again.

The time slice system can be explained as follows:

A plurality of programs are processed in the predetermined order of their priority at a constant time, that is, using time for CPU which a scheduler assigns to the program.

The multiprocessor system can be explained as follows:

A plurality of CPUs are provided and a plurality of programs are processed in parallel, in order to realize the computer system having high performance, which is excellent in high speed, reliability, and expandability.

However, in the microprocessor of the interruption processing system, the following problem exists.

While the program is branching to another routine for processing the specific program, other programs must be interrupted. Due to this, loss time is generated, and execution speed of the microprocessor is reduced.

In the microprocessor of the time slicing system, the following problem exists.

Since using time for a CPU, which a scheduler assigns to the program, is roughly sliced (ms unit), time restriction must be received.

In the microprocessor of the multiprocessor system, the following problem exists.

Since a plurality of CPUs of parallel processing type are needed, the manufacturing cost increases, the management of the CPUs are complicated, and the efficiency of CPUs are generally decreased.

SUMMARY OF THE INVENTION

An object of the present invention is to provide a microprocessor which can simultaneously process a plurality of programs in a relatively short period of time.

More specifically, there is provided a microprocessor processing for data corresponding to a plurality of computer programs comprising a plurality of program counters for pointing out an address to be presently processed in one of the programs, means for selecting one of the program counters wherein the selecting means has a plurality of independent storing means for storing an arbitrary selection order of the program counters, an arithmetic logic unit for processing data in accordance with the program of the address pointed out by one of the program counters selected by the selecting means, and means for transferring data between the program counters, the selecting means, and the arithmetic logic unit.

According to the above structure, the address corresponding to the computer program counters is designated to the plurality of programs. Further, the selecting means shows the selection order of the plurality of program counters, thereby the arithmetic logic unit processes the plurality of programs alternately. That is, the plurality of programs can be controlled in a time-sharing manner. Moreover, the arbitrary selection order of the plurality of programs can be set depending on how the selection order is stored in the storing means in the selecting means. Thereby, various time sharing programs can be processed.

Furthermore, the plurality of storing means independently operate, and the specific storing means is selected, so that the predetermined selection order can be instantaneously set, and parallel time sharing process of various plurality of programs can be executed.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1B is a block diagram showing a specific embodiment of a PC block 15 shown in FIG. 1A and a scheduler block 16;

DETAILED DESCRIPTION OF THE PREFERRED EMBODIMENTS

The microprocessor of the present invention will be explained with reference to the drawings.

The microprocessor of the present invention is similar to a microprocessor having four CPUs from a functional viewpoint. From a structural view point, the microprocessor of the present invention has one CPU, but the CPU executes a plurality of programs alternately in a time sharing manner. Thereby, the processor of the present invention can control a plurality of objects in real time.

The structure of a microprocessor 10 shown in FIGS. 1A and 1B will be explained.

Figures 1A, 3A, 3B, 3C:
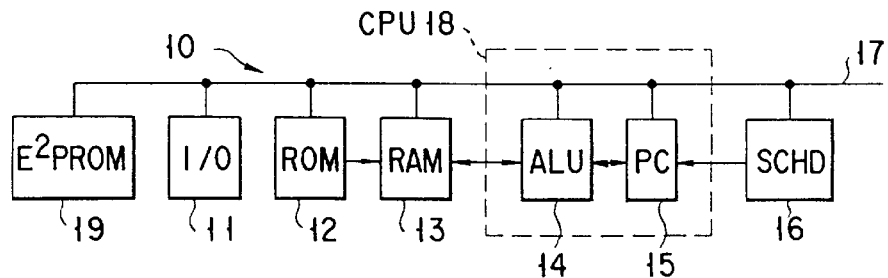
FIG. 1A is a block diagram showing a microprocessor of an embodiment of the present invention.
FIGS. 3A, 3B, and 3C are tables showing the program counter designated by each scheduler of the present invention.

FIG. 1A is a block diagram showing a microprocessor according to the embodiment of the present invention. FIG.

1B is a block diagram showing a specific embodiment of a PC block 15 shown in FIG. 1A and a scheduler block 16. In this case, the microprocessor 10 of FIG. 1A is provided in one silicon chip. Moreover, the microprocessor 10 comprises an I/O unit 11, a ROM 11, a RAM 13, an ALU 14 (Arithmetic Logical Unit), the PC (Program Counter) 15 and the scheduler (hereinafter called "SCHD") block 16. Moreover, there is a case that the microprocessor also comprises an EEPROM 19 holding the storing content of the SCHD 16 and appropriately changing the storing content.

These I/O unit 11, ROM 11, RAM 13, ALU 14 (Arithmetic Logical Unit), PC (Program Counter) block 15 and the SCHD block 16 are connected to a bus line 17. Moreover, ROM 12, RAM 13, and ALU 14 are connected to one another, ALU 14 and PC block 15 are connected to each other, and PC block 15 and SCHD block 16 are connected to each other.

ALU 14 and PC block 15 constitute a CPU 18. As shown in FIG. 1B, the PC block 15 has a PC selector 5 and a PC group 6. The PC group 6 comprises four PCs, that is, PC0, PC1, PC2, and PC3. However, the present invention can be attained if two or more PCs are provided. Each of PCs (PC0, PC1, PC2, PC3) serves as a dedicated register for holding an address of a command of a program to be executed next.

The PC selector 5 is used to select the PCs (PC0, PC1, PC2, PC3).

The SCHD block 16 comprises a SCHD setting section 1, a SCHD selecting section 3, a SCHD register file section 2 for data setting of SCHD (2 bits×8×4 blocks), a SCHD counter section 4, a column designation unit 21, a sense amplifier 22, and row designation unit 23.

The SCHD register file section 2 comprises four SCHDs (SCHD1, SCHD2, SCHD3, SCHD4), and is used to set the operation order of the PC group 6. The SCHD register file section 2 uses a maximum of four blocks (SCHD1 to SCHD4). Also, only one block can be used.

The SCHD setting section 1 sets data of the operation order of the PC (PC0 to PC3) in each of SCHDs 1 to 4 of the SCHD register file section 2.

The SCHD selecting section 3 is divided into a row selector and a column selector, and outputs a 2-bit data signal to a PC selector 5 via a data line D2. The SCHD selecting section 3 selects data set in each SCHD (SCHD1 to SCHD4) of the SCHD register file section 2.

The SCHD counter 4 supplies a 3-bit data signal to the SCHD selecting section 3 via a data line D1.

The I/O unit 11 is an I/O interface inputting/outputting data.

An operation of the microprocessor 10 to operate the PC of the above-mentioned embodiment will be explained with reference to drawings.

Figure 2:
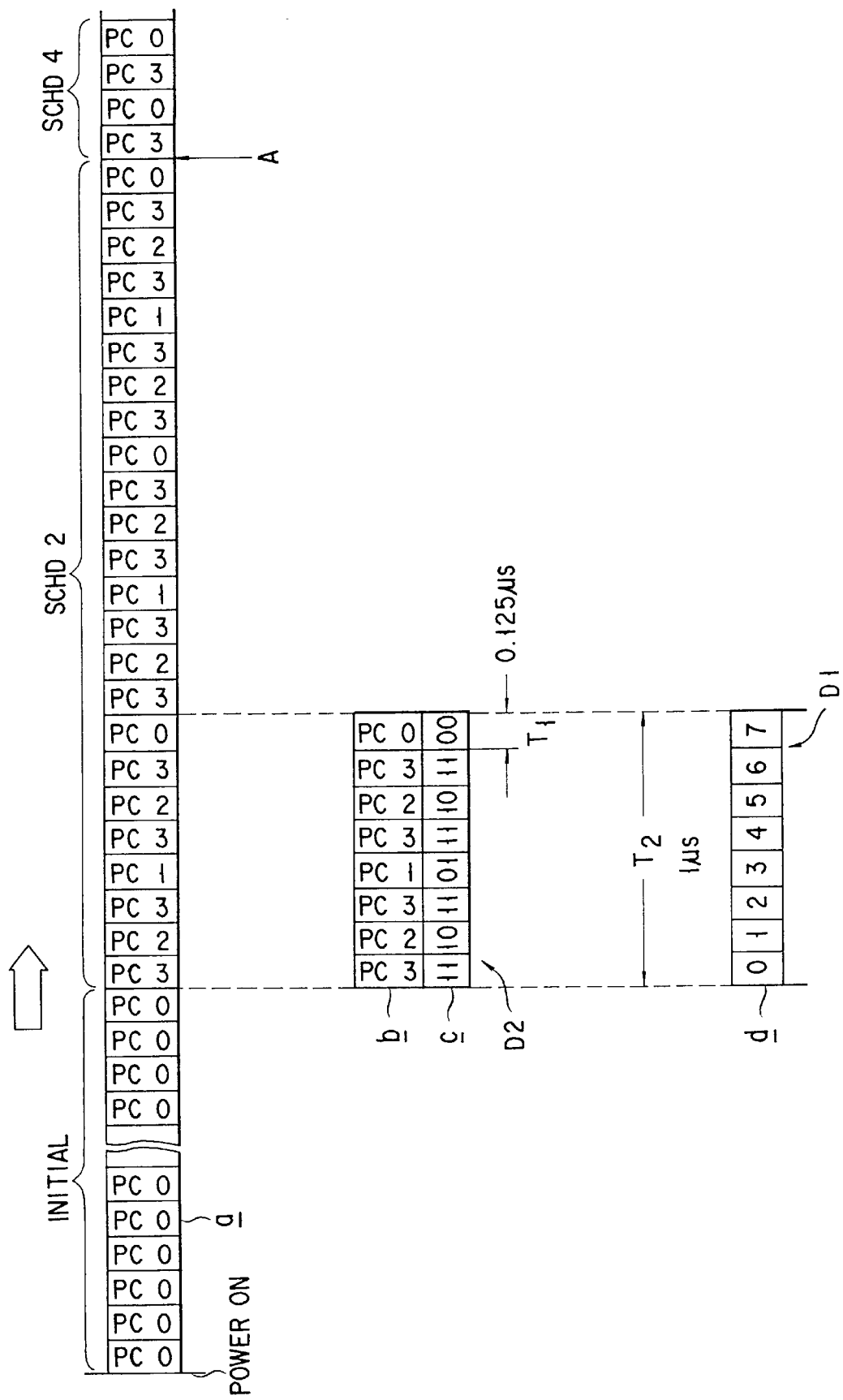
FIG. 2 is a view showing a relation between the order of the program counter selected by the scheduler of the present invention and data outputted based on the program counter.

FIG. 2 is a view showing an execution order of the PC in the microprocessor. In this drawing, a section a is a view showing which program counter is selected by SCHD when the microprocessor is turned on. For example, "PC3" shows that the program counter 3 is selected. A section b is a view showing a part of the operation order of PC shown in FIG. 2, and a section c is a view showing a 2-bit signal to be outputted to the SCHD selecting section 3 from the SCHD counter 4. For example, 2-bit signal "11" shows PC3 and 2-bit signal "00" shows PC0. A section d is a view showing a signal to be outputted to the SCHD selecting section 3 from the SCHD counter. For example, 0 shows a first register in the SCHD.

FIG. 3A shows a data table showing an example of an execution of PC, which each scheduler selects. For example, SCHD1 of FIG. 3A shows data set in eight registers provided in SCHD1. A first 2-bit signal "3" of SCHD2 shows PC3 set in the first register, and a 3-bit signal "2" shows PC2 set in the second register. In this drawing, SCHD 1 shows that PC0 is continuously designated. In a case where a program to be processed is one, there is considered that one program is continued to be designated and processed by PC0.

FIGS. 3B and 3C show examples of the other data of the scheduler. FIG. 3B shows the case in which all data of scheduler are set to "0" (zero) by an external terminal or a special command, and PC0 is always selected. FIG. 3C shows the case that SCHD1 to SCHD4 correspond to PC0 to PC3, respectively, and one type of program is continued to be selected so as to continue designating one type of PC. In these examples, data is reserved in EEPROM 19 of FIG. 1, and data is moved to SCHD 16 as required, so that the operation can immediately correspond to one using state of one program counter.

The operation of the microprocessor 10 relating to the contents of SCHD1 to SCHD4 will be explained.

First, data is transmitted to the SCHD setting section 1 via a bus line 17 on the program. The SCHD setting section 1 receives data from the bus line 17, and sets the execution order of the PC (PC0 to PC3) to the SCHD (SCHD1 to SCHD4) as shown in FIG. 3.

More specifically, the SCHD setting section 1 sets data shown in SCHD 1 of FIG. 3, and sets the operation order of PC (PC0 to PC3) shown in SCHD2 of FIG. 3. Moreover, the SCHD setting section 1 sets the operation order of PC (PC0 to PC3) shown in SCHD3 of FIG. 3, and sets the operation order of PC (PC0 to PC3) shown in SCHD4 of FIG. 3.

On the other hand, data instructing which scheduler should be selected is sent to the SCHD selecting section 3 from a data line (not shown). In accordance with the command, the SCHD selecting section 3 selects, for example, SCHD 2. If the operation order of PC (PC0 to PC3) is set by the SCHD setting section 1, it is further set which scheduler should be selected. Then, a 3-bit select signal D1 is transmitted to the SCHD selecting section 3 from the SCHD counter 4. Due to this, SCHD selecting section 3 selects any one of eight data set in the selected SCHD in order.

For example, if the SCHD2 is selected, the SCHD2 of FIG. 3, that is, a series of program counters shown in the section b of FIG. 2, is selected in order.

The SCHD selecting section 3 outputs a 2-bit data signal of data shown in the selected section c of FIG. 2 to the PC selector 5.

The PC selector 5 receives the data signal from the SCHD selecting section 3, and selects the PC in the order of PC3, PC3, PC3, PC1, PC3, . . . as shown in the SCHD2 of the section a of FIG. 2. If the PC selection is performed up to PC0 as shown in the section a, the PC selection is repeated from the PC3.

By the above-mentioned operation, the program is executed in accordance with the address held in the PC in the operation order shown in the section a. In a case where SCHD1 is set, only program counter PC0 is executed, and other PCs (SCHD1 to SCHD3) are not executed.

Moreover, if a reset signal RSET shown in FIG. 1B is inputted from an external terminal 20, each bit of the scheduler 2 is all reset to "0." The reset signal is also sent to a program counter 15 via a reset unit 24.

Regarding the state of these signals, as shown in an INITIAL section of the section a of FIG. 2, the PC0 is automatically continued to be designated until the signal which the scheduler designates is generated at the time of turning on the power supply.

Finally, if the microprocessor 10 of FIG. 1A receives a command of the end of the operation via the bus line 17, the operation is ended.

An execution speed of the program to be executed in accordance with the address held in each PC will be explained with reference to the drawings.

For example, in a case where the execution order of PC is set in the SCHD2 as shown in the section a of FIG. 2, the execution speed of the program in accordance with each PC will be explained as follows.

That is, as shown in FIG. 2, it is assumed that using time for the CPU to be assigned to one command is 1 $\mu$s. In accordance with the execution of one command, PC is executed eight times. Therefore, one operation time of PC can be obtained by ⅛ $\mu$s, and T1 is 0. 125 $\mu$s. Therefore, in the case where the operation order of the PC is set as shown in the section b of FIG. 2, PC0 and PC1 are executed once in accordance with one command, so that using time for CPU to be assigned to the PC0 is 0.125 $\mu$s, and its using speed is 1.000 $\mu$s/INST.

Since PC2 is executed twice, using time for CPU to be assigned to the PC2 is 0.25 $\mu$s, and its using speed can be obtained by ½, that is, the using speed is 0.500 $\mu$s/INST.

Since PC3 is executed four times, using time for CPU to be assigned to the PC3 is 0.5 $\mu$s, and its using speed can be obtained by ¼, that is, the using speed is 0.250 $\mu$s/INST.

PC0, PC1, PC2, PC3, ... PC0 shown in the section a of FIG. 2 means that each PC is arranged in the execution order.

PC3, PC2, PC3, ... PC0 shown in the section b of FIG. 2 shows a part of PC shown in the section a of FIG. 2. Moreover, signals D1 "11, 10, 11, ... 00" sent from the SCHD counter 4 is that "3, 2, 3, ... 0" are shown by 2-bit signal so as to correspond to PC3, PC2, PC3, ... PC0.

Furthermore, 0 to 7 of the section d of FIG. 2 means 3-bit signal D1 to be supplied to the PC selector 4 from the SCHD selecting section 3.

And as other embodiment, many external terminals (FIGS. 1B, 31, 32) of the microprocessor is formed and a user can supply specific, for example, two bits signals (meaning of SCHD 1:00) via to the terminals. Accordingly, the processor selects the specific scheduler 1 by the specific signals regardless of program contents of that time. Thereby, a user can select the desire scheduler all the time via to the terminals. And in FIG. 1B, the signal from the terminals works the Row selector 3 and 23 and the specific scheduler is selected forcely.

According to the above-structured microprocessor, a user can set a processing interval (time) of a plurality of programs to the SCHD register file section 2 by one command unit.

The CPU is used at above-explained using time and using speed. Then, the PC is repeatedly operated in the arrangement order set in the register, thereby each PC is executed every constant time fixed by data set in the SCHD.

Therefore, the program can be processed at high speed as required. Moreover, since the processing time can be distributed so as to correspond to each program, efficiency of the system can be improved.

Additionally, data setting of the SCHD of the register file section 2 to be selected (2 bits×8) can be changed by the command during the execution of the program as required. Thereby, the execution order of the program can be changed during the execution of the program as required.

The present invention is not limited to the abovementioned embodiment. The present invention can be variously modified.

For example, in the above embodiment, four SCHDs are provided. However, the present invention can be attained if two or more SCHDs are provided.

Moreover, in the above embodiment, four PCs are provided. However, the present invention can be attained if two or more PCs are provided.

For example, the SCHD setting section 1 freely rewrites SCHD1, SCHD3, and SCHD4 in accordance with the command from the bus line 17 in selecting the SCHD2. Moreover, the SCHD selecting section 3 freely selects the SCHD in accordance with the command, and, for example, SCHD2 is changed to SCHD3. Thereby, the selection order of the program counter PC is changed during the execution of the program.

Moreover, the content itself during the selection of the program counter PC may be rewritten.

According to the above-explained structure, even in the microprocessor having one CPU, the user can set the processing time of the plurality of programs by one command unit. As a result, the program can be processed at high speed as required. Moreover, the processing time can be distributed so as to correspond to each program, and efficiency of the entire system can be improved.

Moreover, the processing time of the programs can be clarified, and real time (parallel) processing of the microprocessor can be easily designed.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A microprocessor for processing data corresponding to a plurality of computer programs, comprising:

a plurality of program counters, each one of said plurality of program counters specifying a program address of one of said plurality of computer programs having data to be currently processed by said microprocessor;

means for storing information indicating a plurality of orders in which each of said plurality of program counters is to be selected;

means for sequentially selecting each of said plurality of program counters in accordance with said information stored in said storing means;

an arithmetic logic unit for sequentially processing data of computer programs corresponding to program addresses stored in said program counters sequentially selected by said selecting means; and means for transferring data between said plurality of program counters, said selecting means, and said arithmetic logic unit, wherein a user can designate said order in which each of said plurality of program counters is to be selected by said selecting means by writing said information indicating said order into said storing means.

2. A microprocessor according to claim 1, further comprising means for storing said plurality of computer programs.

3. A microprocessor according to claim 1, further comprising an electrically erasable programmable read-only memory connected to a bus line, for memorizing said information indicating said plurality of orders in which each of said plurality of program counters is to be selected by said selecting means and supplying said information to said selecting means.

4. A microprocessor according to claim 1, wherein said plurality of program counters comprises four program counters, and said information indicating an order in which each of said plurality of program counters is to be selected by said selecting means comprises four independent sequences of program addresses.

5. A microprocessor according to claim 4, further comprising an electrically erasable programmable read-only memory connected to a bus line, for memorizing said information indicating said plurality of orders in which of said plurality of program counters is to be selected by said selecting means and supplying said information to said selecting means.

6. A microprocessor according to claim 1, wherein said storing means comprises four storage sections each having eight registers.

7. A microprocessor according to claim 1, further comprising means for controlling said selecting means such that said selecting means continues to sequentially select said plurality of program counters from a time when power is supplied to said microprocessor to a time when a specific command is given to said selecting means.

8. A microprocessor according to claim 1, further comprising means for altering said information indicating a plurality of orders in which each of said plurality of program counters is to be selected by said selecting means upon receipt of a predetermined command signal from one of said plurality of computer programs.

9. A microprocessor according to claim 1, further comprising means for altering said information indicating a plurality of orders in which each of said plurality of program counters is to be selected by said selecting means in accordance with a signal output from an external terminal of said microprocessor.

10. A microprocessor according to claim 1, further comprising means for controlling operation of said selecting means in accordance with a signal output from an external terminal of said microprocessor.

11. A microprocessor for processing data corresponding to a plurality of computer programs, comprising:

a plurality of program counters, each one of said plurality of program counters specifying a program address of one of said plurality of computer programs having data to be currently processed by said microprocessor;

means for sequentially selecting each of said plurality of program counters, said selecting means having a plurality of independent storing means for storing information indicating a plurality of orders in which each of said plurality of program counters is to be selected;

an arithmetic logic unit for sequentially processing data of computer programs corresponding to program addresses stored in program counters sequentially selected by said selecting means;

means for storing said plurality of computer programs;

means for transferring data between said storing means, said plurality of program counters, said selecting means, and said arithmetic logic unit; and an electrically erasable programmable read-only memory connected to a bus line, for memorizing said information indicating said a plurality of orders in which each of said plurality of program counters is to be selected by said selecting means and supplying said information to said selecting means.

* * * * *